United States Patent [19]

Van Leeuwen et al.

[11] Patent Number: 5,145,823
[45] Date of Patent: Sep. 8, 1992

[54] POLYMERIZATION PROCESS

[75] Inventors: Petrus W. N. M. Van Leeuwen; Cornelis F. Roobeek, both of Amsterdam, Netherlands

[73] Assignee: Shell Oil Company, Houston, Tex.

[21] Appl. No.: 680,443

[22] Filed: Apr. 4, 1991

Related U.S. Application Data

[62] Division of Ser. No. 466,559, Jan. 17, 1990, Pat. No. 5,025,091.

[30] Foreign Application Priority Data

Jan. 26, 1989 [NL] Netherlands ............... 8900184

[51] Int. Cl.5 .................. B01J 31/22; B01J 31/24
[52] U.S. Cl. .................... 502/155; 502/153; 502/158; 502/162; 556/12; 556/22
[58] Field of Search .............. 502/155, 153, 158, 162; 556/12, 22

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 4,818,810 | 4/1989 | Drent | 528/392 |
| 4,835,250 | 5/1989 | Drent | 528/392 |
| 4,843,144 | 6/1989 | Van Broekhoven et al. | 528/392 |
| 4,868,282 | 9/1989 | Van Broekhoven et al. | 528/392 |
| 4,880,900 | 11/1989 | van Doorn et al. | 502/158 X |
| 4,880,903 | 11/1989 | Van Broekhoven et al. | 528/392 |
| 4,935,396 | 6/1990 | van Doorn et al. | 502/162 X |

FOREIGN PATENT DOCUMENTS

| | | |
|---|---|---|
| 121965 | of 1984 | European Pat. Off. |
| 181014 | of 1985 | European Pat. Off. |
| 213671 | of 1986 | European Pat. Off. |
| 222454 | of 1986 | European Pat. Off. |
| 246683 | of 1987 | European Pat. Off. |
| 257663 | of 1987 | European Pat. Off. |
| 1081304 | of 1967 | United Kingdom. |
| 1414662 | 11/1975 | United Kingdom. |

Primary Examiner—Patrick P. Garvin

[57] ABSTRACT

Linear alternating polymers of carbon monoxide and at least one ethylenically unsaturated hydrocarbon, useful as premium thermoplastics, are produced by contacting the carbon monoxide and hydrocarbon reactants under polymerization conditions in the presence of a catalyst complex of hydrocarbylpalladium halide and a bidentate ligand of phosphorus. The catalyst complex is produced by contacting a complex of palladium dihalide and the bidentate phosphorus ligand with a tetrahydrocarbyltin.

7 Claims, No Drawings

POLYMERIZATION PROCESS

This is a division of application Ser. No. 07/466,559 filed Jan. 17, 1990 and now U.S. Pat. No. 5,025,091.

FIELD OF THE INVENTION

The present invention relates to an improved process for the production of linear alternating polymer of carbon monoxide and at least one ethylenically unsaturated hydrocarbon. More particularly, the invention relates to such a process employing a novel catalyst composition which comprises a hydrocarbylpalladium halide complex of a bidentate phosphorus ligand. The invention also relates to a process for the production of that complex.

BACKGROUND OF THE INVENTION

The class of polymers of carbon monoxide and olefin(s) is well known in the art. Brubaker, U.S. Pat. No. 2,495,286, produced such polymers of relatively low carbon monoxide content in the presence of free radical initiators, e.g., peroxy compounds. G. B. 1,081,304 produced similar polymers of higher carbon monoxide content in the presence of alkylphosphine complexes of palladium salts as catalyst. Nozaki extended the reaction to produce linear alternating polymers in the presence of arylphosphine complexes of palladium compounds and certain inert solvents. In Nozaki, U.S. Pat. No. 3,694,412 for example, there is disclosed a complex of a hydrocarbylpalladium halide and an aryl monophosphine. More recent processes for the production of the linear alternating polymers are illustrated by a number of published European patent applications including 121,965, 181,014, 213,671, and 257,663. These published applications generally involve the use of a catalyst composition formed from a compound of a Group VIII metal selected from palladium, cobalt or nickel, particularly palladium, the anion of a non-hydrohalogenic acid having a pKa below about 6, preferably below 2, and a bidentate ligand of phosphorus, arsenic or antimony, especially phosphorus.

More recently, the class of linear alternating polymers of carbon monoxide and at least one ethylenically unsaturated hydrocarbon has become of greater interest, in part because of the greater availability of the polymers. The linear alternating polymers, now known as polyketones or polyketone polymers, are relatively high molecular weight materials having established utility as premium thermoplastics. The polyketones are processed by methods conventional for thermoplastics, e.g., injection molding, extrusion and thermoforming, into a variety of shaped articles such as sheets, films, and shaped articles. Although the processes illustrated by the above published European patent applications produce the polyketone polymers in good yield, it would be of advantage to provide an additional process for the production of these polyketones.

SUMMARY OF THE INVENTION

The present invention provides an improved process for the production of linear alternating polymer of carbon monoxide and at least one ethylenically unsaturated hydrocarbon. More particularly, the present invention provides a process for the production of such linear alternating polymers in the presence of a novel catalyst composition comprising a hydrocarbylpalladium halide complex with a bidentate phosphorus ligand. The present invention also relates to a process for the production of the hydrocarbylpalladium halide.

DESCRIPTION OF THE INVENTION

The polyketone polymers which are produced by the improved process of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other $\alpha$-olefins including propylene, 1-butene, isobutylene, 1-hexene, 1-octene, and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene, m-isopropylstyrene. Preferred polymers are copolymers of carbon monoxide and ethylene or terpolymers of carbon monoxide, ethylene, and a second hydrocarbon of at least 3 carbon atoms, particularly an $\alpha$-olefin such as propylene.

The structure of the polyketone polymers is that of a linear alternating polymer and the polyketone polymer will contain substantially one molecule of carbon monoxide for each molecule of hydrocarbon. When the preferred terpolymers are produced according to the invention there will be at least about 2 units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymeric chain of the preferred polymers is therefore represented by the repeating formula

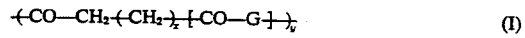 (I)

wherein G is a moiety of an ethylenically unsaturated hydrocarbon of at least 3 carbon atoms polymerized through the ethylenic unsaturation. The $-CO\text{-}(CH_2\text{-}CH_2)\text{-}$ units and the $-CO\text{-}(G)\text{-}$ units are found randomly throughout the polymer chain and the ratio of y:x is no more than about 0.5. When copolymers of carbon monoxide and ethylene are produced by the process of the invention there will be no second hydrocarbon present and the copolymer is represented by the above formula I wherein y is zero. When y is other than zero, i.e., terpolymers are employed, the preferred ratios of y:x are from about 0.01 to about 0.1. The end groups or "caps" of the polymer chain will depend in part on what materials were present during the production of the polymer and how or whether the polymer has been purified. The precise nature of the end groups does not appear to influence the properties of the polymer to any considerable extent so that the polyketone polymers are fairly represented by the formula for the polymeric chain as depicted above.

Of particular interest are the polyketone polymers of number average molecular weight from about 1,000 to about 200,000, particularly those polyketone polymers of number average molecular weight from about 20,000 to about 90,000, as determined by gel permeation chromatography. The physical properties of the polymer will depend in part on the molecular weight, whether the polymer is a copolymer or a terpolymer and, in the case of terpolymers, the nature of and the proportion of the second hydrocarbon present. Typical melting points for such polyketone polymers are from about 175° C. to about 300° C., with polymers having a melting point from about 210° C. to about 270° C. being more frequently encountered. The polyketones will have a limiting viscosity number (LVN), measured in m-cresol at 60° C. in a standard capillary viscosity measuring device, from about 0.5 dl/g to about 10 dl/g, preferably from about 0.8 dl/g to about 4 dl/g.

The polyketones are produced according to the process of the invention by contacting the carbon monoxide and hydrocarbon reactants under polymerization conditions in a reaction diluent in the presence of a catalyst composition formed from a bidentate ligand of phosphorus and a hydrocarbylpalladium halide. The bidentate phosphorus ligand is a ligand wherein each phosphorus is substituted with two monovalent aromatic substituents and the group linking the two phosphorus-containing moieties has three atoms in the bridge. One class of such bidentate phosphorus ligands is represented by the formula

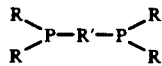 (II)

wherein R independently is an aromatic group of up to 12 carbon atoms inclusive. R is hydrocarbyl containing only atoms of carbon and hydrogen as illustrated by phenyl, tolyl, xylyl, and naphthyl, or R is substituted hydrocarbyl containing additional atoms in the form of monovalent aromatic ring substituents, particularly polar substituents, at least one of which is located on a ring carbon atom which is ortho to the carbon atom through which the aromatic ring is connected to the phosphorus. Preferred polar substituents are lower alkoxy of up to 4 carbon atoms inclusive, particularly methoxy, and illustrative substituted hydrocarbyl R groups include 2-methoxyphenyl, 2-ethoxyphenyl, 2,6-dimethoxyphenyl, 2-propoxy-4-ethoxyphenyl, and 2,4,6-trimethoxyphenyl. The class of phenyl and 2-methoxyphenyl is a preferred class of R substituents. The group R' is a divalent bridging group having up to 10 carbon atoms inclusive and 3 atoms in the bridge connecting the phosphorus-containing moieties. The preferred R' groups are 1,3-propylene (trimethylene), 2,2-dimethylpropylene, and 2,2-dimethyl-2-sila-1,3-propylene. The preferred bidentate ligands are those wherein all R groups are the same, for example, 1,3-bis(diphenylphosphino)propane or 2,2-dimethyl-1,3-bis(diphenylphosphino)-2-silapropane.

The hydrocarbylpalladium halide precursor of the catalyst composition of the invention is of the formula

R"—PdX (III)

wherein R" is hydrocarbyl, preferably alkyl including arylakyl, of up to 10 carbon atoms inclusive and X is halide, e.g., fluoride, chloride, bromide or iodide, but preferably is chloride. The group R" is preferably lower alkyl of up to 4 carbon atoms and more preferably is methyl.

The catalyst compositions are formed from substantially equimolar quantities of the hydrocarbylpalladium halide and the bidentate phosphorus ligand. The palladium compound and the bidentate phosphorus ligand form an equimolar complex and the catalyst composition is conveniently provided as that complex. The complex is produced by contacting the more conventional equimolar complex of palladium halide, PdX$_2$, wherein X has the previously stated meaning, and the bidentate ligand of phosphorus as defined above (formula II) with a tetrahydrocarbyltin of the formula (R")$_4$Sn wherein R" has the previously stated meaning. Tin compounds such as tetramethyltin, tetraethyltin, tetrabutyltin, trimethyloctyltin, and tetrabenzyltin are suitable although tetramethyltin is preferred. By way of specific illustration, tetramethyltin reacts with the equimolar complex of palladium dichloride and 1,3-bis(diphenylphosphino)propane to produce an equimolar complex of methylpalladium chloride and 1,3-bis(diphenylphosphino) propane. The tetrahydrocarbyltin appears to react in a unique fashion, since treatment of the same palladium dichloride complex with a hydrocarbylmagnesium halide, a hydrocarbyllithium compound or dihydrocarbylzinc results in production of a dihydrocarbylpalladium complex rather than the hydrocarbylpalladium halide complex of the present invention. Although it is preferred to react the tetrahydrocarbyltin and a preformed complex of palladium dihalide and the bidentate phosphorus ligand, it is also useful to form the desired complex in-situ as by contacting the tetrahydrocarbyltin compound, the desired bidentate ligand of phosphorus, and a palladium dihalide complex with some other stabilizing ligand, e.g., a monophosphine such as triphenylphosphine.

The contacting of the tin compound and the palladium dihalide complex is conducted in a liquid phase in the presence of a reaction diluent. The molar ratio of tetrahydrocarbyltin to palladium dihalide complex is not critical and molar ratios of tin compound to palladium dihalide complex from about 1:1 to about 4:1 are suitable. Ratios from about 1.5:1 to about 2.5:1 are preferred. The reaction diluent is suitably a diluent or mixture of diluents in which the desired catalyst complex is produced and the desired polymerization can also be conducted. Mixtures of lower alkanol such as methanol and ethanol, preferably methanol, with halohydrocarbons such as methylene chloride, methylene bromide or chloroform are satisfactory. The temperature of the contacting is not critical and temperatures from about 10° C. to about 120° C. are satisfactory. The reaction pressure to be employed should be sufficient to maintain the reaction mixture substantially in the liquid phase. Pressures from about 0.8 bar to about 10 bar are suitable. After the contacting of the tetrahydrocarbyltin and the palladium dihalide complex, the hydrocarbylpalladium halide complex is isolated as by solvent removal or precipitation with a non-solvent but most conveniently is empoyed in-situ as the catalyst composition in the production of the polyketone polymer.

The production of polyketone is accomplished by contacting the monomeric reactants in the reaction diluent under polymerization conditions with sufficient catalyst composition to provide from about $1 \times 10^{-7}$ mole to about $1 \times 10^{-3}$ mole of palladium per mole of ethylenically unsaturated hydrocarbon reactant. Amounts of catalyst composition sufficient to provide from about $1 \times 10^{-6}$ mole to about $1 \times 10^{-4}$ mole of palladium per mole of hydrocarbon reactant are preferred. The molar ratio of carbon monoxide to total olefinically unsaturated hydrocarbon should be from about 10:1 to about 1:10, preferably from about 5:1 to about 1:5. Typical polymerization conditions include a reaction temperature below about 75° C. and preferably below about 50° C. Suitable reaction pressures are from about 2 bar to about 150 bar, preferably from about 5 bar to about 100 bar. Subsequent to polymerization the reaction is terminated as by cooling the reactor and contents and/or releasing the pressure. The polyketone polymer is typically obtained as a material substantially insoluble in the reaction diluent and is recovered by conventional methods such as filtration or decantation. The polymer is used as recovered or is purified as by contact with a solvent or extraction agent selective for catalyst residues.

The polyketone polymer product is a thermoplastic of established utility. The polymer is processed by methods conventional for the processing of thermoplastics into a variety of shaped or formed articles including films useful in packaging and containers for food and drink.

The invention is further illustrated by the following Comparative Examples (not of the invention) and the following Illustrative Embodiments which should not be construed as limiting the invention.

ILLUSTRATIVE EMBODIMENT I

An equimolar complex of methylpalladium chloride and 2,2-dimethyl-1,3-bis(diphenylphosphino)-2-sila-propane was produced by the following procedure. To a suspension of 2 mmol of an equimolar complex of palladium dichloride and 2,2-dimethyl-1,3-bis(diphenylphosphino)-2-silapropane in a mixture of 10 ml of dichloromethane and 10 ml of methanol was added 4 mmol of tetramethyltin. After two hours of stirring at room temperature the solvents were removed by distillation at reduced pressure. The residue was washed three times with diethyl ether and then dried in vacuo at room temperature. The product was 1.15 g of the equimolar complex of methylpalladium chloride and 2,2-dimethyl-1,3-bis(diphenylphosphino)-2-silapropane.

ILLUSTRATIVE EMBODIMENT II

An equimolar complex of methylpalladium chloride and 2,2-dimethyl-1,3-bis(diphenylphosphino)-2-silapropane was produced by the following procedure. To a suspension of 2 mmol of an equimolar complex of palladium dichloride and 2,2-dimethyl-1,3-bis(diphenylphosphino)-2-silapropane in a mixture of 50 ml of dichloromethane and 50 ml of methanol was added 4 mmol of timethyltin. After refluxing for three hours in an argon atmosphere, the solvents were removed by vacuum distillation. The solid residue was recovered by filtration, washed with 5 ml of diethyl ether and dried in vacuo at room temperature. The product was 0.95 g of an equimolar complex of methylpalladium chloride and 2,2-dimethyl-1,3-bis(diphenylphosphino)-2-silapropane.

ILLUSTRATIVE EMBODIMENT III

A linear alternating copolymer of carbon monoxide and ethylene was produced by charging to an autoclave of 250 ml capacity equipped with a stirrer a catalyst composition solution comprising 100 ml of methanol and 0.1 mmol of the equimolar complex produced in Illustrative Embodiment I. After the air in the autoclave was removed by evacuation, an equimolar mixture of carbon monoxide and ethylene was added until a pressure of 40 bar was reached. After 1.5 hours of stirring at room temperature the polymerization was terminated by releasing the pressure. The polymer product was recovered by filtration, washed with methanol, and dried in vacuo at room temperature. The product obtained was 1.2 g, produced at a rate of 75 g of copolymer/g Pd hr.

ILLUSTRATIVE EMBODIMENT IV

A linear alternating copolymer of carbon monoxide and ethylene was produced by a procedure substantially similar to that of Illustrative Embodiment III except that the methylpalladium chloride complex was that produced in Illustrative Embodiment II and the reaction time was 4 hours instead of 1.5 hours. The yield of copolymer was 1.5 g, produced at a rate of 35 g copolymer/g Pd hr.

COMPARATIVE EXAMPLE I

The procedure of Illustrative Embodiment III was repeated except that the palladium complex contained palladium dichloride instead of methylpalladium chloride. No polymerization took place.

COMPARATIVE EXAMPLE II

The procedure of Illustrative Embodiment IV was repeated except that the palladium complex contained palladium dichloride instead of methylpalladium chloride. No polymerization took place.

COMPARATIVE EXAMPLE III

A linear alternating copolymer of carbon monoxide and ethylene was produced by a procedure substantially similar to that of Illustrative Embodiment III except that the palladium complex contained palladium dichloride instead of methylpalladium chloride, the reaction temperature was 110° C. instead of room temperature and the reaction time was 2 hours instead of 1.5 hours. A yield of 1.5 g of copolymer was obtained, produced at a rate of 70 g of copolymer/g Pd hr.

What is claimed is:

1. An equimolar complex of a hydrocarbylpalladium halide, wherein the hydrocarbylpalladium halide is of the formula

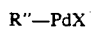

wherein R" is alkyl of up to 10 carbon atoms inclusive and X is halide, and a bidentate ligand of phosphorus wherein the bidentate ligand of phosphorus is of the formula

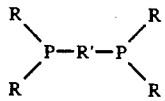

wherein R independently is an aromatic group of up to 12 carbon atoms inclusive and R' is a divalent linking group of up to 10 carbon atoms inclusive and 3 atoms in the bridge connecting the phosphorus-containing moieties.

2. The complex of claim 1 wherein X is chloride and R" is a lower alkyl of up to 4 carbon atoms.

3. The complex of claim 2 wherein R independently is phenyl or 2-methoxy-phenyl.

4. The complex of claim 3 wherein R' is 1,3-propylene, 2,2-dimethylpropylene, or 2,2-dimethyl-2-sila-1,3-propylene.

5. The complex of claim 4 wherein R" is methyl.

6. A process for the production of a complex of a hydrocarbylpalladium halide, wherein the hydrocarbylpalladium halide is of the formula R″—PdX wherein R″ is alkyl of up to 10 carbon atoms inclusive and X is halide and a bidentate ligand of phosphorus, wherein the bidentate ligand of phosphorus is of the formula

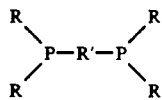

wherein R independently is an aromatic group of up to 12 carbon atoms inclusive and R' is a divalent linking group of up to 10 carbon atoms inclusive and 3 atoms in the bridge connecting the phosphorus-containing moieties, which comprises contacting a corresponding complex of palladium dihalide and bidentate phosphorus ligand with a tetrahydrcarbyltin of the formula $(R'')_4Sn$, wherein R″ is alkyl of up to 10 carbon atoms inclusive.

7. The process of claim 6 wherein the equimolar complex is produced by contacting an equimolar complex of palladium dichloride and 1,3-bis(diphenylphosphino)propane with tetramethyltin.

* * * * *